(12) United States Patent
Ferlitsch et al.

(10) Patent No.: US 8,395,801 B2
(45) Date of Patent: Mar. 12, 2013

(54) METHODS AND SYSTEMS FOR HANDLING FILES FOR MFPS UTILIZING EXTERNAL SERVICES

(75) Inventors: Andrew Rodney Ferlitsch, Camas, WA (US); Joseph Bert Murdock, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 13/473,833

(22) Filed: May 17, 2012

(65) Prior Publication Data
US 2012/0224211 A1    Sep. 6, 2012

Related U.S. Application Data

(62) Division of application No. 12/264,167, filed on Nov. 3, 2008, now Pat. No. 8,199,348.

(51) Int. Cl.
*G06F 3/12* (2006.01)

(52) U.S. Cl. ........ 358/1.15; 358/1.9; 358/403; 709/232; 709/238; 726/3; 726/4; 726/26

(58) Field of Classification Search ................ 358/1.1, 358/1.9, 1.15, 403; 709/232, 238; 726/3, 726/4, 26
See application file for complete search history.

(56) References Cited

U.S. PATENT DOCUMENTS

| | | | |
|---|---|---|---|
| 7,921,284 B1* | 4/2011 | Kinghorn et al. | 713/160 |
| 2005/0071632 A1* | 3/2005 | Pauker et al. | 713/165 |
| 2007/0180273 A1* | 8/2007 | Dohi | 713/193 |

\* cited by examiner

*Primary Examiner* — King Poon
*Assistant Examiner* — Jamares Q Washington
(74) *Attorney, Agent, or Firm* — Larry K. Roberts (57) ABSTRACT

An exemplary embodiment of a system and method provides a determination of when a file/document format native to a device such as a multifunction peripheral (MFP) device should be handled natively by the MFP (default behavior) or preprocessed by an external service.

3 Claims, 8 Drawing Sheets

METHODS AND SYSTEMS FOR HANDLING FILES FOR MFPS UTILIZING EXTERNAL SERVICES

This application is a division of and claims priority from U.S. application Ser. No. 12/264,167, filed Nov. 3, 2008 now U.S. Pat. No. 8,199,348, the entire contents of which application is incorporated herein by this reference.

BACKGROUND

Printing devices, such as multifunction peripheral (MFP) devices capable of multiple functions such as copying and printing, can receive electronic output jobs or files from a connected host device such a PC, or over a network such as a local area network (LAN) or wide area network (WAN). The devices typically have loaded into a memory a format translation service necessary to output the file for one or more document formats. For such output jobs, the file format is considered to be a native format. However, the device may not have loaded into memory the format translation service for other document formats, and these other formats are considered non-native formats.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

In the following detailed description and in the several figures of the drawing, like elements are identified with like reference numerals. The figures are not to scale, and relative feature sizes may be exaggerated for illustrative purposes.

A decision on whether to handle an electronic file or document wholly internally within an outputting device such as an MFP or use an external service has previously been made on the basis of whether the file format of the document is native to the printer or not. In some cases, it may be desirable to have some file formats which are native to the MFP be handled by the external service, instead of the MFP. Examples of cases might include load balancing, special processing, and use policies. In an exemplary embodiment, a determination is made as to whether a format native to the MFP is handled natively by the MFP (default behavior) or preprocessed by an external service.

Host and MFP web services are being developed which allow users to directly submit documents for outputting to a device such as an MFP, whereby some part of the processing (e.g., conversion) to convert the file into a complete engine-ready form is performed by an external service connected to the MFP. For example, the MFP would expose a print web service, while an external host (server) would expose a document conversion service. In this scenario, if a user submitted a print job, and the document format was not native to the printer, the printer would find an external conversion service to convert the document into a format that is native to the printer.

An exemplary embodiment of a system and method provides a means for an external service or management entity to indicate to an outputting device such as an MFP device when a format native to the MFP should be handled natively by the MFP (default behavior) or preprocessed by an external service. The management entity may alternatively be embedded in the MFP device acting as an agent for one or more MFP devices. Additionally, the decision/indication may be made dynamically, and thus can be changed on-the-fly (e.g., such as per changes in use policies, operating loads, or preprocessing requirements).

An exemplary operating environment includes one or more MFP devices with a file browsing capabilities (e.g., using a front panel or a web page). The exemplary operating environment also includes one or more external services which are communicatively coupled to the MFP device(s).

When the MFP initiates a file browse or a job request (e.g., print job) for a document/file, the MFP contacts one or more external services. This may be initiated by an action of the user (front panel operation) or programmatically as part of a workflow. For a file browse, this may involve using the external service to read information (files) from a device coupled to the MFP, that the MFP cannot read itself (e.g., because it lacks the appropriate driver). For a job request, the MFP may request a service to convert the document data in one format to another format. The external service(s) respond back to the MFP with a list of file types handled by the service, for the particular service requirement. Additionally, the list may be augmented with a tag per file type, on whether the file type MUST be handled by the external service.

In one exemplary embodiment, the MFP will always contact the service when the MFP initiates a file browse or job request. Alternatively, a central manager entity that caches information on services may be employed, and contacted initially instead of the external service.

The MFP then combines the list of supported non-native file types with its list of supported native file types. The combined list can then be used for filtering in a file selection operation or file support verification in a job request.

The MFP also records in its combined list where the file type is initially handled (e.g., MFP vs. service), based on the tag information provided by the external service. When a file is selected, or present in a job request, the MFP determines where the file data is handled according to the 'where handled' field in the combined list, instead of a decision based on the native/non-native status of the format.

Additionally, the determination by the service on whether a file type MUST be handled by the service can be made dynamically, and may change from request to request. Examples of reasons for dynamically changing where the file type is handled include load balancing on the MFP, processing requirements of an external or controlling application, and use policies (e.g., time of day, user, etc).

Figure 1:
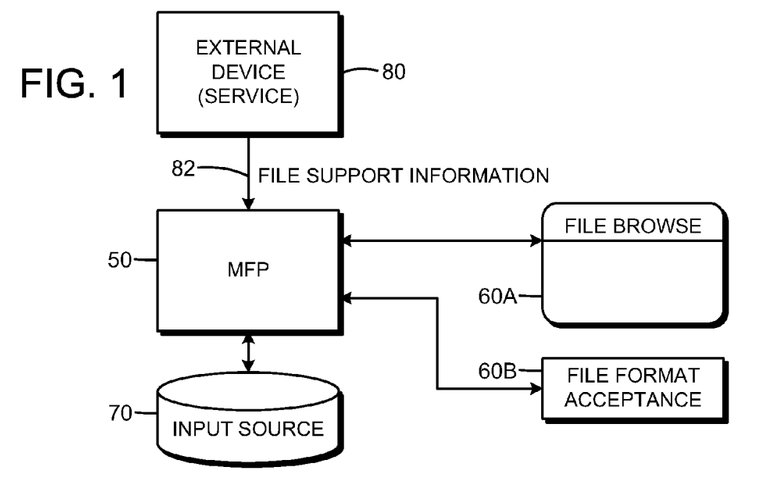
FIG. 1 is a schematic illustrating an exemplary operating environment.

FIG. 1 is a schematic illustrating an exemplary operating environment. The exemplary operating environment includes one or more MFPs 50 with either a file browse/selection capability 60A and/or file format acceptance means 60B for a document within a job request. The file browse/selection means 60A enables a user to directly select files for processing/outputting from the MFP, such as front panel selection, USB drive, FTP, and device web page selection. Examples of a file format acceptance means 60B include email print, direct print, FTP, and printing protocol (e.g., LPR, RAW, IPP, WS, etc). The acceptance means 60B may be implemented either within the MFP 50 or provided as a service by the external device 80.

The MFP 50 receives input job requests or files from an input source 70. The input source can be any source, including, by way of example and without limitation, a host computer, USB thumb drive, FTP site, Internet download, and an email account.

An outputting operation by the MFP may include any outputting operation, such as print, copy, fax (inbound/outbound), scan to destination, format conversion, file transfer, filing, publishing, display, and audio/visual (A/V) recording/playback.

The exemplary operating environment also includes one or more external services 80, which provide output processing related services to the MFP, such as format conversion, Bates number stamping, watermarks, copyright filtering, access control, job auditing/accounting, and optical character recognition (OCR)/indexing.

Additionally, the external services may include web services, and may be communicatively coupled with the MFPs by link 82, such as by web services (e.g., Microsoft WS, PWG WS), SOAP/XML, or proprietary protocol over TCP/IP.

Figure 1A:
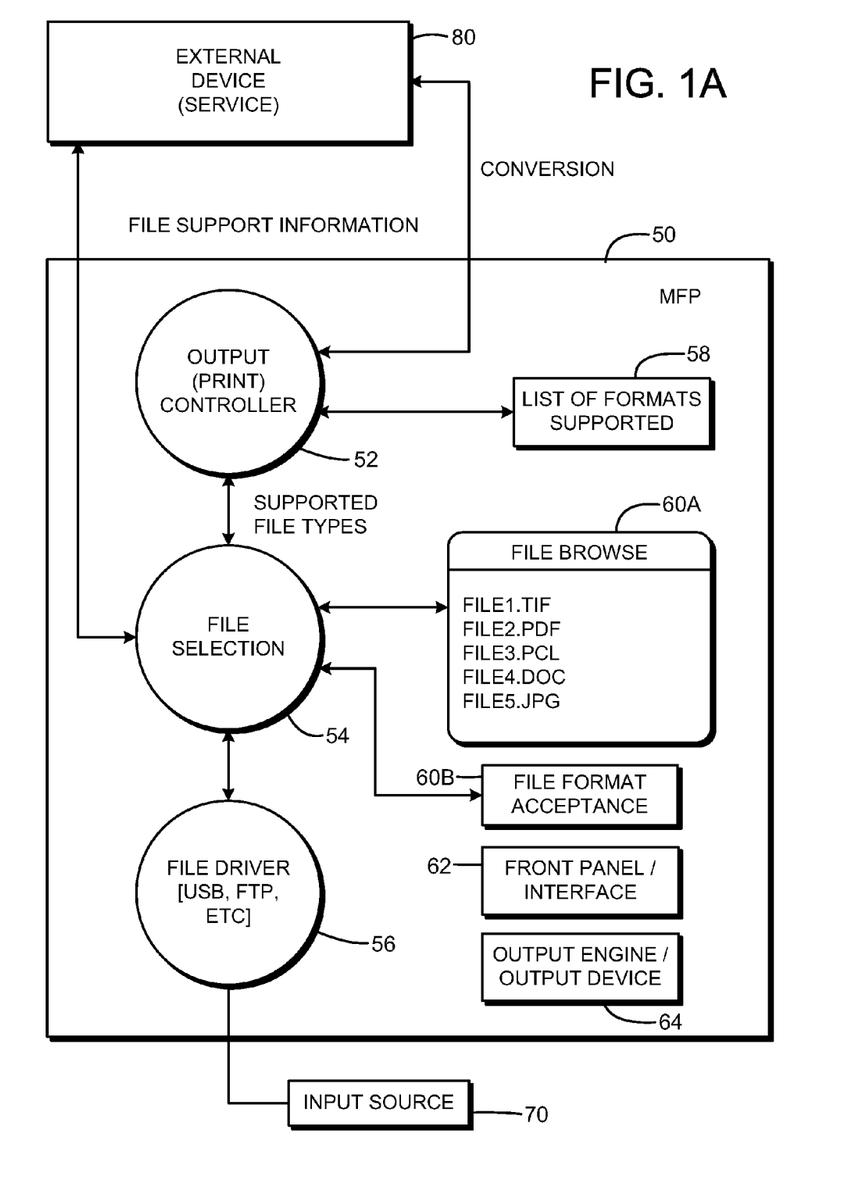
FIG. 1A illustrates features of an exemplary MFP in the exemplary operating environment.

FIG. 1A illustrates an exemplary MFP 50 in the exemplary operating environment. The MFP includes an output controller 52, which controls the output engine or output device 64 of the MFP, e.g. a print engine, scanner, copier, etc. The output engine 64 receives output job data from the output controller 52 in a complete engine-ready format, and the engine outputs the job without further processing of the data.

The MFP also includes a file selection function 54, responsive to file browse function 60. The file browse function allows the MFP or user to browse files presented through the input source, in various formats. FIG. 1A depicts exemplary files of several exemplary formats, including TIF, PDF, PCL, DOC and JPG formats. A file driver function 56 is also provided, which may include drivers for the input source 70. Examples of drivers include USB and FTP drivers. The MFP may include a front panel interface 62 for allowing user control/input. The file selection function may interface with the external device or service 80 to exchange file support information, and maintain in memory a list 58 of formats supported. In an exemplary embodiment, for an output print function, for the case in which the external service is to provide format conversion services for a particular document, the input file is sent to the external service 80, and the converted file information is returned to the output controller 52 from the external service.

Figure 2:
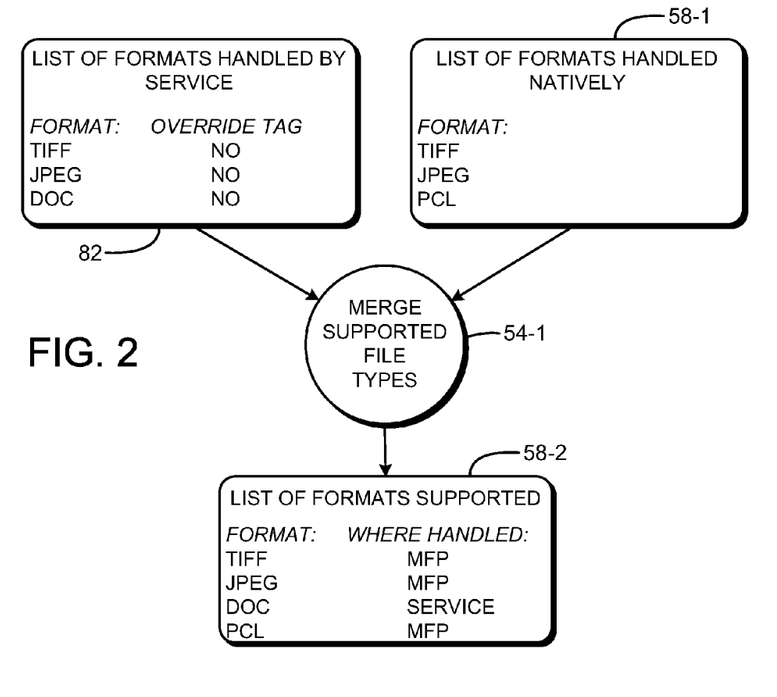
FIG. 2 is an exemplary embodiment of a system for determining a list of supported file types.
Figure 3:
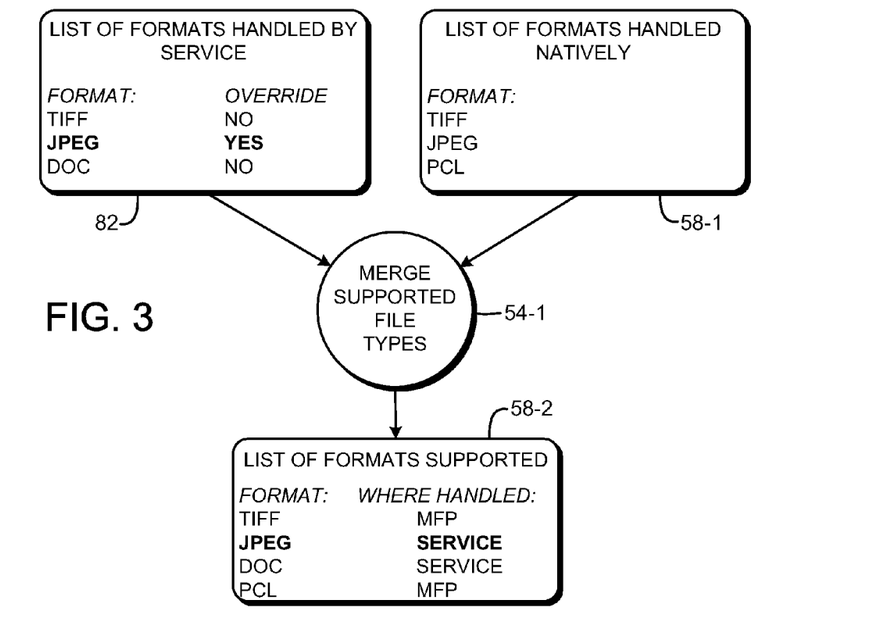
FIG. 3 is a schematic illustration of an embodiment configured to combine the service-supported file type information, with override tags, with a list of file types which are supported natively by the MFP, to determine a list of supported formats.

FIGS. 2 and 3 illustrate schematically an exemplary embodiment of a system and method for determining a list of supported file types. In the exemplary embodiment, when the user initiates a file browse/selection from the MFP 50, or the MFP receives a job request for a document, the MFP first contacts one or more external services 80 (FIG. 1). The MFP may identify the external services to contact by any means, such as, preregistration in the MFP, a broadcast request for external service providers, manual entry by the user, and identification by the job request.

As part of contacting the external service, the MFP requests from the service the file formats which the service can preprocess for the MFP, such as for a document conversion service. When the service responds, the response contains:

1. A list 82 of file types supported by the service.
2. A tag per file type indicating if the file type MUST be handled by the service (instead of by the MFP when the file type is native to the MFP).

Upon receipt of the response from the external service, the MFP then combines (function 54-1) the supported file type information 82 with the list 58-1 of file types which are supported natively by the MFP. The combined list additionally contains a tag, indicating where each file type must be processed (e.g., MFP or the external service), as illustrated in the following example:

1. External service:
   a. The file type is supported by the service and is marked or tagged as a MUST be processed by the external service.
   b. The file type is supported by the service and is NOT supported natively by the MFP.
2. MFP.
   a. The file type is supported natively by the MFP and is either not supported by the service, or not marked as must be processed by the service.

FIG. 2 depicts the tags associated with each format type as having "no" override status. In FIG. 3, the JPEG format is associated with a "yes" override status, and so JPEG-format files must be handled by the external service 80 in this example, even though JPEG is a native format of the MFP, as indicated by the combined list 58-2 (FIG. 3).

Figure 4:
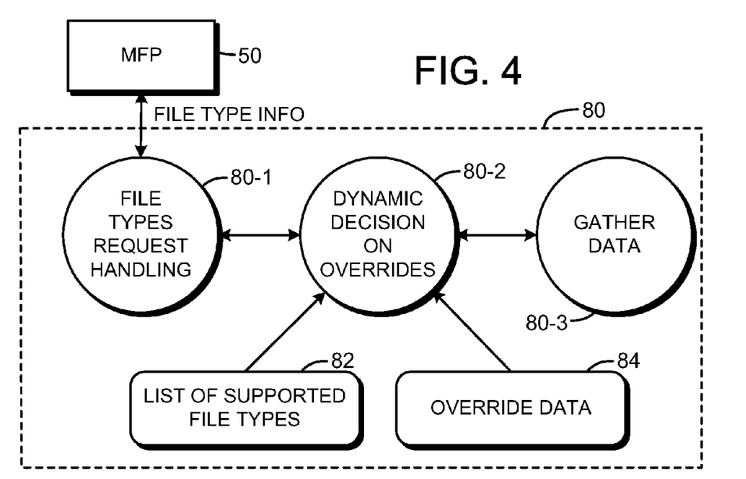
FIG. 4 illustrates an exemplary embodiment of a system for dynamically determining which files type must be handled by the external service.

FIG. 4 illustrates an exemplary embodiment for dynamically determining which files type must be handled by the external service. In this example, the external service can dynamically (on-the-fly) make the determination on which file types must be processed by the service, as opposed to being optionally processed by the service. Generally, this may happen as follows:

1. The external service 80 receives a supported file types request from the MFP 50.
2. The external service 80 includes a handling function 80-1 which receives the request from the MFP, a dynamic decision function 80-2, which receives some information from data gathering function 80-3 that pertains to the decision, on a per file type basis. Examples of the types of information which may be gathered include device and service loads, cost of service, quality of service, time to availability, and speed of service.
3. Using the gathered information, the dynamic decision function 80-2 of the external service 80 determines which file types MUST be processed by the service, for this invocation.
4. The external service then constructs a response containing the supported file types from list 82 and the corresponding override tag 84.

4. Examples of Decision Criteria

In an exemplary embodiment, the service may make the decision on whether a file type MUST be processed by the service based on any condition and/or algorithm. Three examples are described below.

Figure 5:
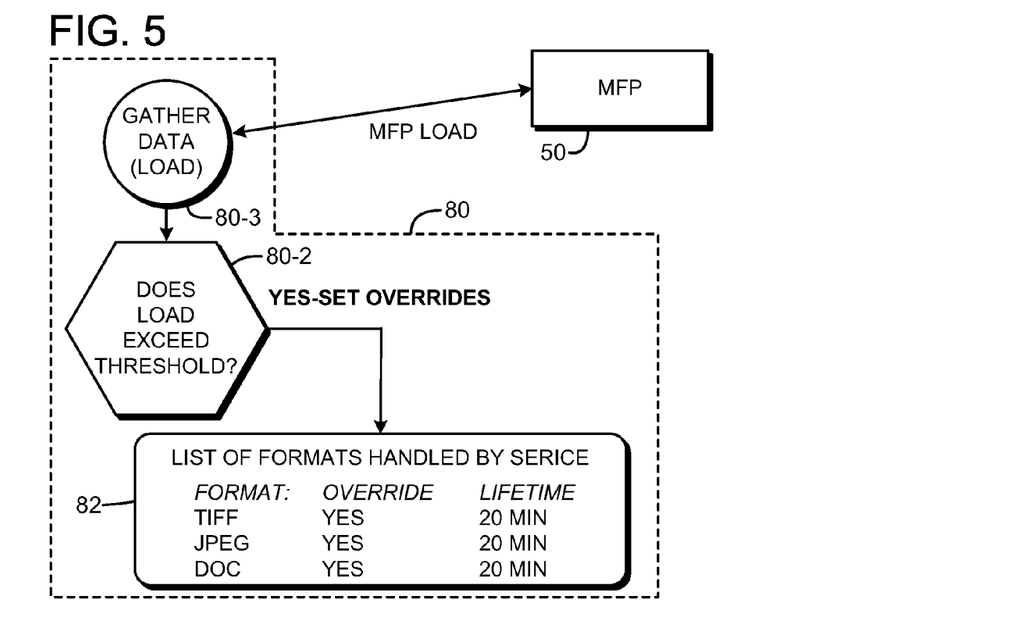
FIG. 5 is an exemplary embodiment of a system illustrating decision criteria.

FIG. 5 is an exemplary embodiment of a system illustrating the use of MFP loading as a decision criterion. In this embodiment, the decision is based on the current MFP load. Typically, a process 80-3 on the external service would query the MFP to determine is current and/or short-term projected load. The information may be returned in any form, such as CPU load, available memory/disk space, number (and type) of jobs pending, complexity of jobs being processed, and the size/complexity of the proposed job. This information may be obtained by the service either as:

1. Information already provided in the supported file types request.
2. Querying the MFP for the above information.
3. As event notifications from the MFP when there is a change in the condition.

The supported file types request may be in any protocol, such as web service, SOAP/XML, HTTP/HTML, proprietary protocol over TCP/IP, AppleTalk.

The query or event notification may be implemented by any protocol, such as web service, PJL read back command and SNMP.

After the service obtains the MFP load information, it determines (function 80-2) if the load exceeds some threshold. If so, the service will set in the file type response, e.g., in list 82, that all or some select group of file types must be processed by the service.

Generally, processing by the service means converting the file format into a format that is either completely or more fully processed for the MFP than the original format, thus reducing the load on the MFP when a document of this type is processed. Exemplary outputs include PDL format, intermediate format (e.g., Display List), bitmap format, and engine ready format (e.g., raster).

The service 80 may also selectively consider each file type in this decision, based on how close or how much is to gain from converting the file type to the output format. For example, if both the file type and output format are bitmaps, there is nothing to gain by processing the file type on the service.

The service may also augment each 'override' tag with a lifetime indicator. The lifetime indicator conveys to the MFP how long the override setting is valid. Typically the lifetime indicator would generally be based on an existence of a license (long term) or on a projected time to rebalance the load (short term). If it expires before the MFP initiates the processing of a document of the file type, it must re-request the information from the external service.

Figure 6:
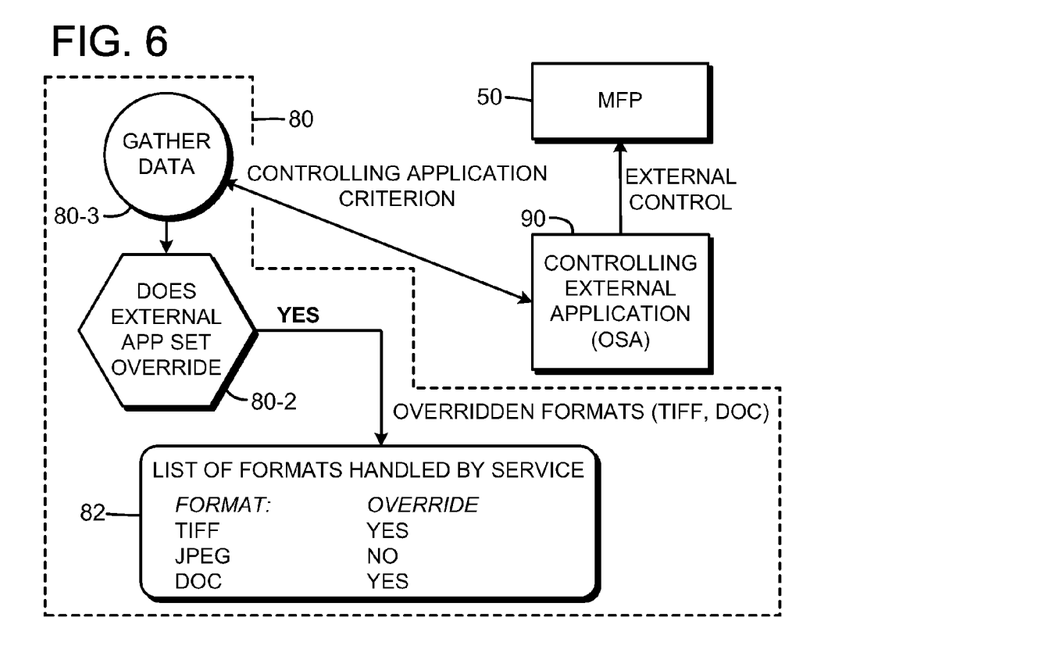
FIG. 6 illustrates an exemplary embodiment in which an MFP job operation is partly or wholly under the control of an external controlling application.

In another embodiment, the MFP or job operation is partly or wholly under the control of an external controlling application 90, such as by a Sharp Open Systems Architecture (OSA) II application. FIG. 6 is a schematic illustration of an exemplary embodiment. Typically, a process such as data gathering function 80-3 on the external service 80 would query the external controlling application. The external service 80 would determine if the type of controlling application requires preprocessing of all or some select set of file types. The preprocessing may be for any reason, such as Bates stamping, watermarks, job auditing/accounting, OCR/indexing, filtering.

The above information may be obtained by the external service 80 either as:

1. Information already provided in the supported file types request.
2. Querying the external controlling application 90 for the above information.
3. As event notifications from the MFP/controlling application when there is a change in the preprocessing requirements.

After the external service 80 obtains the external controlling application's preprocessing requirements, function 80-2 of the service determines for each file type if there is a preprocessing requirement of the controlling application 90 that needs to be performed by the service 80, i.e. whether the controlling application 90 sets an override condition. If so, the service 80 will set in the "file types response," that all or some select group of file types MUST be processed by the service 80.

The service 80 may also augment each 'override' tag with a lifetime indicator. The lifetime indicator conveys to the MFP how long the override setting is valid. If it expires before the MFP initiates the processing of a document of the file type, it must re-request the information from the external service.

Figure 7:
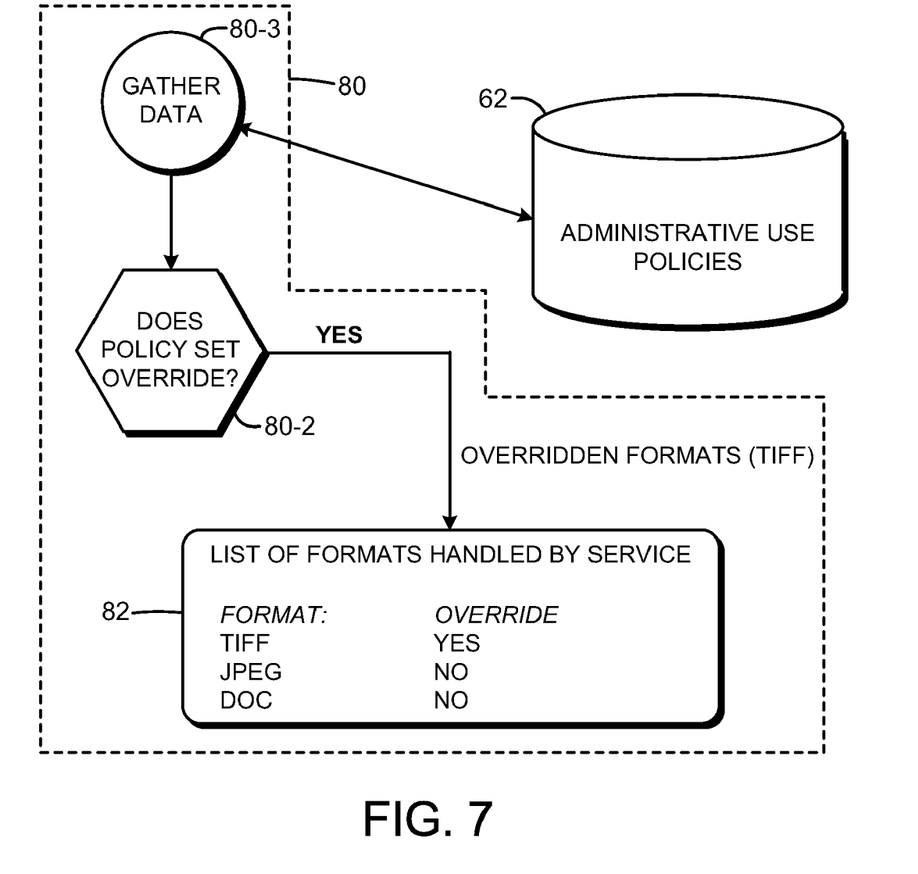
FIG. 7 is a schematic illustrating an exemplary embodiment in which a decision as to which files type must be handled by the external service is based on an administrative use policy.

In another embodiment, the override decision is based on an administrative use policy. FIG. 7 is a schematic illustrating an exemplary embodiment in which the decision is based on an administrative use policy function 62. Administrative use policies are generally maintained by a central administrative server, but may be cached in the MFP. The gather data function 80-3 gathers use policy information from function 62. Function 82 determines whether the administrative policy sets an override condition for a particular format, and the list of formats 82 is updated accordingly. For the example of FIG. 7, the overridden format is the TIFF format. The administrative use policy 62 may be on a per user/group or per MFP basis.

An administrative use policy may be based on any factor, such as:

1. Access rights to services.
2. Access rights to processing on the MFP.
3. Time of day.

For example, a use policy may dictate reducing the processing load on MFPs during normal business hours, without restrictions on non-business hours. Thus, if the file types request was made during business hours, the response would indicate that some or all of the file types MUST be processed by the service.

The service may also augment each 'override' tag with a lifetime indicator, as discussed earlier.

While the exemplary embodiments describe above have discussed service requests primarily relating to a printing device, the service request may be any type of request that may be handled by a peripheral device, such as file input/output (I/O), encryption/decryption, compression, audio/video projection, and an analog/digital (A/D) sensor. For example, the A/D sensor may utilize a service to convert analog information to a specific digital output format, or to aid in the interpreting or post-processing of the digital output.

While the preferred embodiments discussed the service requests as a web service, any protocol may be used, such as, for example, proprietary protocol over TCP/IP, and HTTP.

An example of alternative applications includes the processing of documents having clearance levels, e.g. those handled by federal government agencies or departments. Generally, these federal departments have a need for an access control that is called compartmentalized security. In this example, users would be given a clearance level. A clearance level would determine what actions they could do on types of documents. For example, these might include "Read Down," "Write Up," etc. A "Read Down" would mean that a document a user wrote could be read (but not edited) by people of lower clearance. A Write Up would mean that a document the user wrote could be viewed (edited) by people with higher clearance.

In the past, those accesses have been implemented as part of a specialized file system operating under a trusted computing base (TCB). Today, this type of control can be implemented on top of existing secured file systems, such as an encrypting file system.

Typically, access control is not defined by the file format (e.g., PDF) but by metadata associated with the file. The metadata would be encrypted in one form and the contents in another form. When a user makes a document access, the system decrypts the metadata and compares the access request (e.g., read, write, copy, etc), the user's clearance, the destination (local PC, another user, a copier) and the access rights in the metadata.

In another alternate embodiment, browse control of access-controlled documents can be changed from looking at file types (as in the embodiments of FIGS. 1-7) to include looking at metadata associated with a file. The MFP may have a default clearance that would enable its browser to view (browse) and copy files at a certain clearance level. When a user authenticates himself or herself, the external service or application could dynamically on the fly communicate with the browser control of the MFP on what clearance level the browser should make files available for the presumed user action (e.g., copy).

When the user selects a file from the MFP's browser, the MFP checks the clearance level of the file to that of the MFP. If the clearance level of the MFP is the same or greater, then the MFP presumably could perform the action (natively) without assistance from a web service. Otherwise, the MFP would have to contact the web service and, if the web service clearance level is the same or greater than that of the file, transfer the file and appropriate credentials of the authenticated user to the web service. The web service would decrypt the contents and send it back to the MFP in an engine-ready condition for outputting the contents, e.g. reproduction, without the MFP processing the file and saving its contents in memory.

Figure 8:
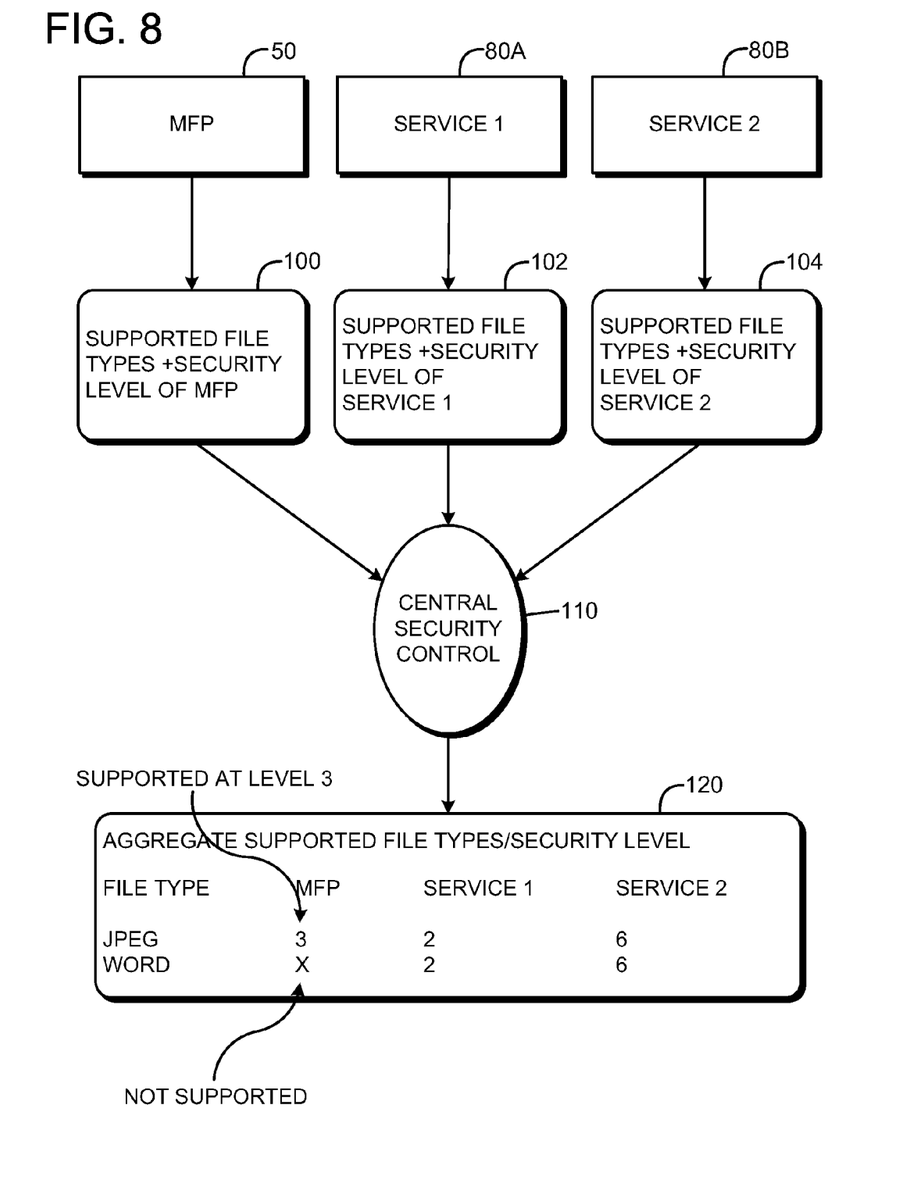
FIGS. 8 and 9 illustrate another exemplary embodiment, in which control of outputting or processing operation is controlled by file type and security level.

FIG. 8 schematically illustrates an exemplary operating environment for this application. The environment includes an MFP 50, external service 1 (80A), and external service 2 (80B). The MFP and the external services may be connected on a network behind a firewall, or outside the firewall, connected by the internet. In the later case, the connections would be secure, such as using SSL over TCP/IP. These external services are the same type of services as in the above-described non-security examples, for example, decryption, decompression, annotation, format conversion. Each of these devices is characterized by a parameter list of supported file types and a security level. Thus, parameter list 100 is associated with the MFP 50, parameter list 102 with service 1, and parameter list 104 with service 2. A central security control function 110 receives the parameter lists from the respective exemplary devices 50, 80A and 80B. Function 110 would typically be implemented in a security server behind a firewall. It could also be virtualized (virtual server) running in a trusted computing base (TCB). In this case, the function 110 could move around, including residing in an MFP. The central security function maintains an aggregate list of supported file types and security levels. In the example depicted in FIG. 8, there are two file types, JPEG and WORD. The MFP supports only the JPEG format, at security level 3. The service 1 (80A) supports both JPEG and WORD formats, at security level 2. The service 2 (80B) supports both JPEG and WORD formats, at security level 6.

Figure 9:
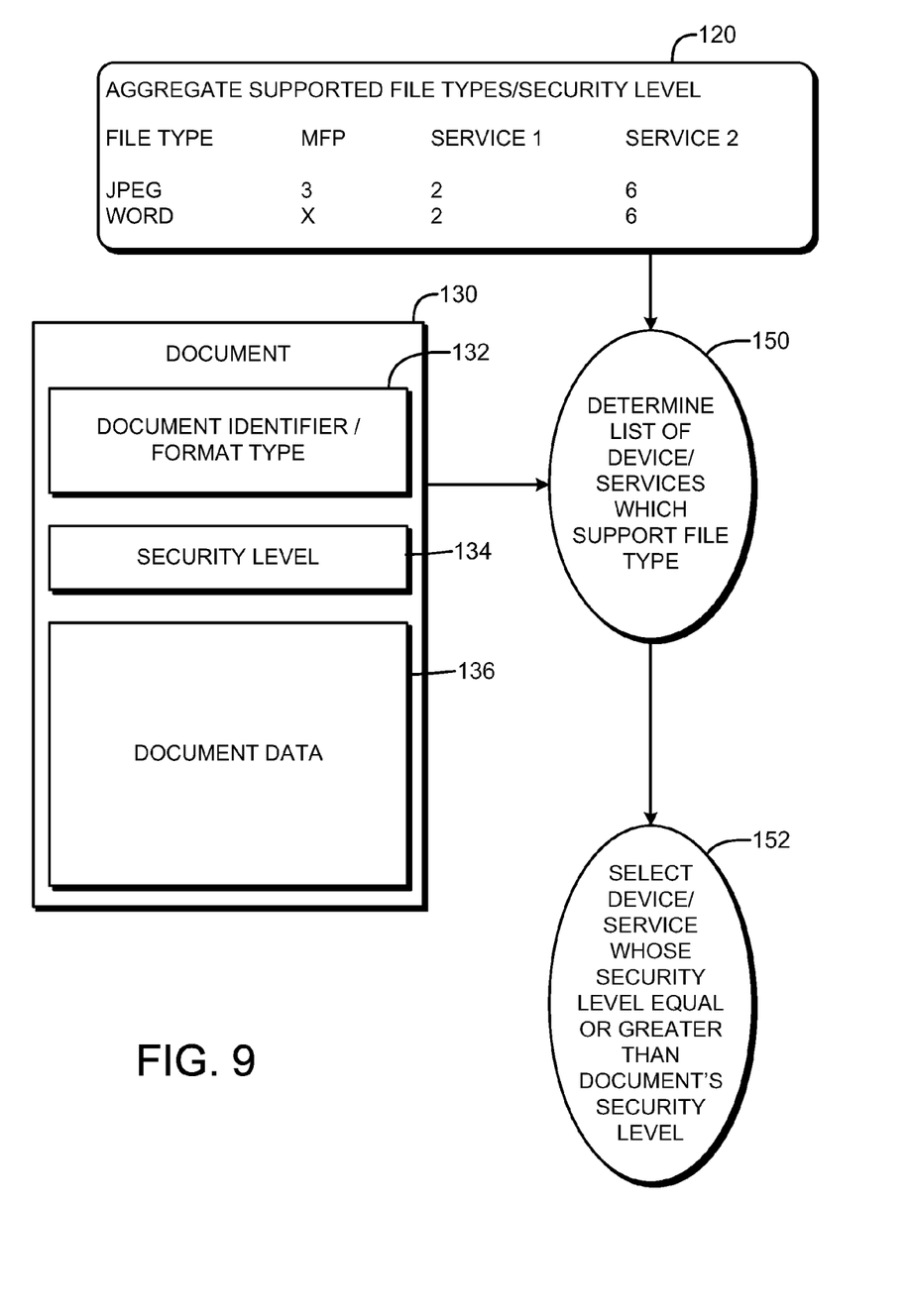

FIG. 9 schematically illustrates a method of processing a document file 130 in accordance with an aggregate parameter list 120. The document file 130 includes a document identifier/format type descriptor as metadata 132, a security level identifier 134 and the document data 136. A process 150 determines, in response to the data 132 and 134, a list of devices/services which support the file type of the document 130 by using the aggregate list 120, and a process 152 selects from this list a device or service whose security level is equal to or greater than the document's security level 134. If for example, the format of document 130 is JPEG and its security level is 3, then the MPF and the service 2 (80B) can process the document, since both support the JPEG format and both have a security level at least equal to 3. The processes 150 and 152 may be implemented as a part of security function 110. If two or more (MFPs or external servers) match the security requirements, then one may be selected based on a secondary factor (speed, availability, load, etc).

The embodiment of FIGS. 8-9 may add a further selection parameter to the exemplary embodiment of FIGS. 1-7, in that first a selection is performed using the file format, and then a further selection is done using the security level of the file. The external service in this embodiment may typically determine whether native format documents are preprocessed by an external service.

The external web service and MFP may perform additional actions to further secure the transfer over the network and having the MFP output (without processing) a document at a higher clearance level than the MFP, such as:

1. The document is re-encrypted at the transport layer for transport between the web service and MFP.

2. The decrypted data is sent in chunks; whereby, the MFP must rasterize and output the data chunk, and then delete the chunk from the copier's storage (obfuscate the memory or hard drive).

Figure 10:
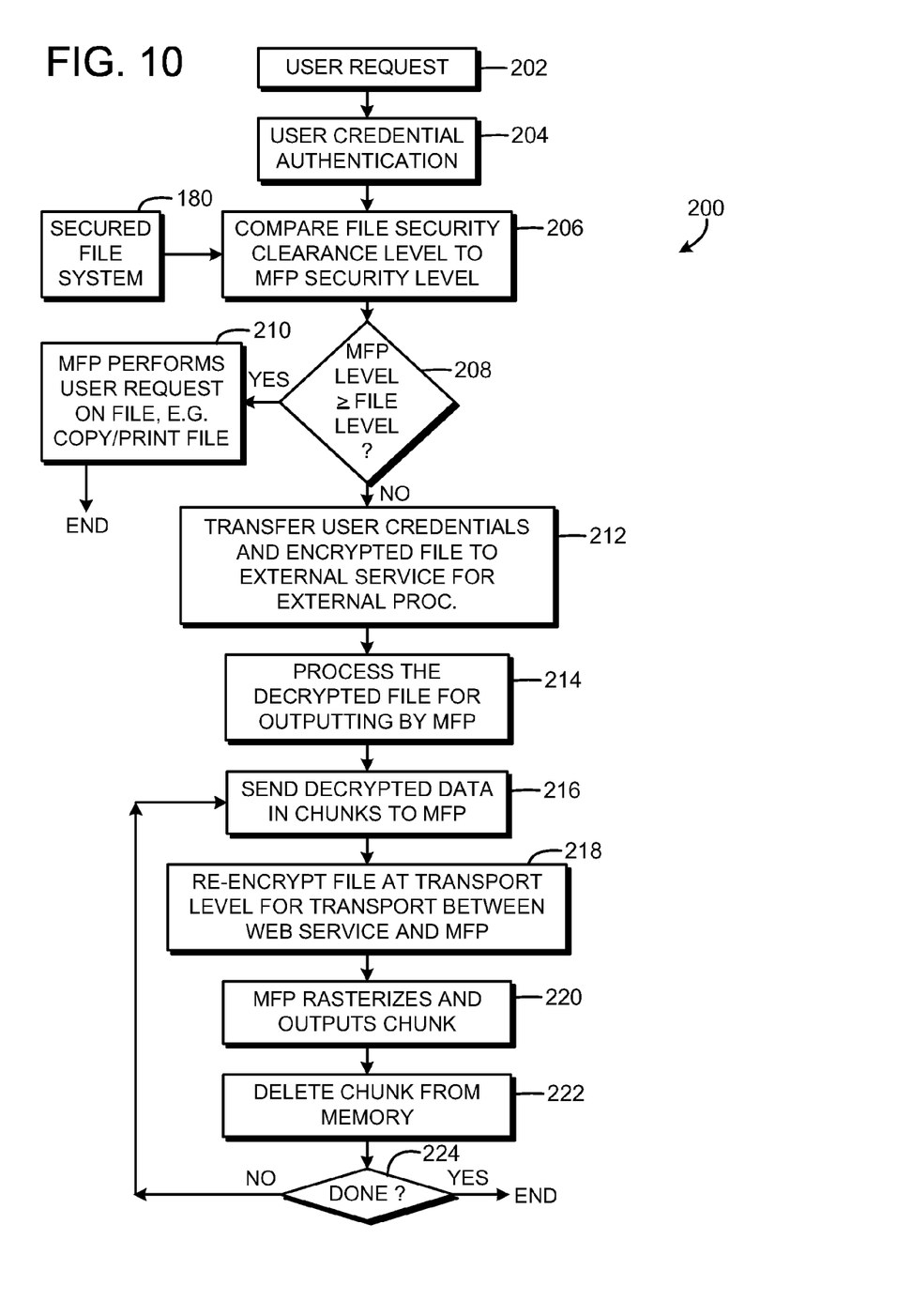
FIG. 10 is a simplified diagrammatic flow diagram illustrating an exemplary embodiment of a method for accessing and processing secured files.

An exemplary embodiment of a method 200 for operating an outputting device such as an MFP for secured files is depicted in FIG. 10. At 202, the user makes a user request. This request may entail selecting a file using the MFP file browse function, such as an encrypted file with a security or clearance level in a secure file system 180. An exemplary user request may be to reproduce or print the file contents. The user's credentials are received by the MFP for authentication (204). The MFP checks the security level of the file, which may be defined by file metadata, to the security or clearance level of the MFP (206). If the clearance level of the MFP is the same or greater (208), then the MFP may perform the user request (210) for processing the file (natively) without assistance from an external service such as a web service. The processing may include decrypting the file contents, processing the de-crypted file contents into output engine-ready format, and outputting the contents from the MFP output engine. For example, if the file is a Microsoft Word® file, and the output job is to print a copy of the file, then the output controller of the MFP processes the file, converting the file contents into an engine-ready format, and the output engine prints the engine-ready data.

If the security level of the file exceeds that of the MFP, then the MFP is not permitted to process the file contents, i.e. to decrypt the file contents and process the file contents into an engine-ready format. In this case, then, the MFP contacts an external service such as a web service, whose security level is at least as high as the security level of the file, and the selected file and appropriate credentials of the authenticated user are transferred to the external service (212). The external service decrypt the file contents and processing it into an engine-ready format for outputting by the output engine of the MFP (214). The decrypted data, i.e. the engine-ready data, is sent back to the MFP, over the Internet in this example, in chunks (216), which may be a small piece of data defining a character, for example. The decrypted chunks may be re-encrypted for transfer at the TCP/IP transport level (218), in the example in which the external service is a web service communicatively coupled to the MFP by the Internet. The MFP directs the engine-ready chunk to the output engine which rasterizes and outputs each chunk (220), e.g. printing the data chunk. The chunk of engine-ready data is deleted from memory or the hard drive of the MFP (222). The process continues until the file request has been completed (224).

Although the foregoing has been a description and illustration of specific embodiments of the subject matter, various modifications and changes thereto can be made by persons skilled in the art without departing from the scope and spirit of the invention.

What is claimed is:

1. A method for determining when a secured electronic file should be handled natively by a multifunction peripheral system (MFP) or preprocessed by an external service, comprising:
    receiving a user action request, including a file browse or a job request, for an electronic file having metadata defining a file security level;
    maintaining a list of file formats supported by the MFP and by an external service, an MFP security level and an external service security level;
    using the list for filtering in a file selection operation or file support verification in the user action request;
    if the clearance level of the MFP is the same or greater than the file clearance level defined by the file metadata, performing the user action request by the MFP;
    if the clearance level of the MFP is lower than the file clearance level defined by the file metadata, and the external service security level is the same as or higher than the file security level, transferring the file and appropriate credentials of the user to the external service for processing the file.

2. The method of claim 1, wherein the file includes encrypted contents, the method further comprising:
    receiving an output-engine ready version of portions of the file contents from the external service at the MFP in successive data chunks, outputting the data chunks from an output engine of the MFP, and deleting the received portions of the file contents from memory at the MFP.

3. The method of claim 1, wherein said using the list for filtering in a file selection operation or file support verification in the user action request further comprises:
    determining whether to process the file at the MFP or the external service in dependence on whether the MFP natively supports the format of the file.

* * * * *